(12) United States Patent
Ding (10) Patent No.: US 9,342,138 B2
(45) Date of Patent: May 17, 2016

(54) MOBILE DEVICE AND ROTATING METHOD OF IMAGE THEREON

(71) Applicant: WISTRON CORP., New Taipei (TW)

(72) Inventor: Bo Ding, New Taipei (TW)

(73) Assignee: WISTRON CORP., New Taipei (TW)

( * ) Notice: Subject to any disclaimer, the term of this patent is extended or adjusted under 35 U.S.C. 154(b) by 103 days.

(21) Appl. No.: 14/199,984

(22) Filed: Mar. 6, 2014

(65) Prior Publication Data
US 2015/0116365 A1      Apr. 30, 2015

(30) Foreign Application Priority Data

Oct. 31, 2013   (CN) .......................... 2013 1 0530019

(51) Int. Cl.
| | | |
|---|---|---|
| *G06T 3/60* | (2006.01) | |
| *G06F 3/00* | (2006.01) | |
| *G09G 5/38* | (2006.01) | |
| *G06F 3/0487* | (2013.01) | |
| *G06F 1/16* | (2006.01) | |
| *G06F 1/32* | (2006.01) | |
| *G06F 3/01* | (2006.01) | |

(52) U.S. Cl.
CPC .............. *G06F 3/002* (2013.01); *G06F 1/1677* (2013.01); *G06F 1/1686* (2013.01); *G06F 1/1694* (2013.01); *G06F 1/3231* (2013.01); *G06F 1/3265* (2013.01); *G06F 3/013* (2013.01); *G06F 3/0487* (2013.01); *G09G 5/38* (2013.01); *Y02B 60/1242* (2013.01); *Y02B 60/1289* (2013.01)

(58) Field of Classification Search
None
See application file for complete search history.

(56) References Cited

U.S. PATENT DOCUMENTS

| | | | | |
|---|---|---|---|---|
| 7,724,296 B2 * | 5/2010 | Lonn | .................. | G06K 9/00248 348/207.99 |
| 8,427,427 B2 * | 4/2013 | Kim | ........................ | G09G 5/00 345/158 |
| 8,593,558 B2 * | 11/2013 | Gardiner | ............... | G06F 1/1626 348/191 |
| 8,896,632 B2 * | 11/2014 | MacDougall | ......... | G06F 1/1626 345/173 |
| 8,971,574 B2 * | 3/2015 | Ye | ...................... | G06K 9/00221 382/103 |
| 2004/0164958 A1 * | 8/2004 | Park | ...................... | G06F 1/1616 345/158 |

(Continued)

FOREIGN PATENT DOCUMENTS

TW           201108032 A1     3/2011

OTHER PUBLICATIONS

WO 2012/120799 Kamei Sep. 13, 2012.*

(Continued)

*Primary Examiner* — Barry Drennan
*Assistant Examiner* — Jason Pringle-Parker
(74) *Attorney, Agent, or Firm* — CKC & Partners Co., Ltd.

(57) ABSTRACT

A rotating method of an image on a mobile device includes detecting a first included angle between a reference direction of the mobile device and a gravity direction, and a first rotational direction that the reference direction of the mobile device has been rotated relative to the gravity direction; selectively generating a first rotating signal according to the first included angle; detecting a second included angle between a reference direction of a user's face and the gravity direction, and a second rotational direction that the reference direction of the user's face has been rotated relative to the gravity direction; selectively generating a second rotating signal according to the second included angle; and rotating the image on the mobile device in a rotational direction opposite to the first rotational direction and/or identical to the second rotational direction.

20 Claims, 9 Drawing Sheets

(56) References Cited

U.S. PATENT DOCUMENTS

| | | | |
|---|---|---|---|
| 2005/0044510 A1* | 2/2005 | Yi | G06F 1/1626 715/864 |
| 2005/0062715 A1* | 3/2005 | Tsuji | G06F 1/162 345/158 |
| 2009/0002391 A1* | 1/2009 | Williamson | G06F 1/1626 345/619 |
| 2010/0066763 A1* | 3/2010 | MacDougall | G06F 1/1626 345/656 |
| 2010/0077341 A1* | 3/2010 | Chen | G06F 1/1626 715/782 |
| 2010/0125816 A1* | 5/2010 | Bezos | 715/863 |
| 2010/0149359 A1* | 6/2010 | Taoka | H04N 5/232 348/222.1 |
| 2011/0032220 A1* | 2/2011 | Shih et al. | 345/204 |
| 2011/0037866 A1* | 2/2011 | Iwamoto | H04N 5/23219 348/222.1 |
| 2011/0074822 A1* | 3/2011 | Chang | G06F 1/1626 345/649 |
| 2012/0254809 A1* | 10/2012 | Yang | G06F 3/038 715/863 |
| 2012/0313970 A1* | 12/2012 | Akiyama | 345/651 |
| 2013/0057571 A1* | 3/2013 | Harris | G06F 1/1613 345/619 |
| 2013/0069988 A1* | 3/2013 | Kamei et al. | 345/658 |
| 2013/0201219 A1* | 8/2013 | Zhao | G06F 3/012 345/649 |
| 2013/0234927 A1* | 9/2013 | Roh | G06F 3/012 345/156 |
| 2013/0293502 A1* | 11/2013 | Kitatani | G06F 3/0488 345/173 |
| 2013/0328935 A1* | 12/2013 | Tu | G06F 1/1694 345/651 |
| 2015/0261319 A1* | 9/2015 | Huang | G06F 3/0488 345/650 |

OTHER PUBLICATIONS

The office action of the corresponding Taiwanese application and its partial English translation.

* cited by examiner

Fig. 5

MOBILE DEVICE AND ROTATING METHOD OF IMAGE THEREON

This application claims priority to Chinese Application Serial Number 201310530019.2, filed Oct. 31, 2013, which is herein incorporated by reference.

BACKGROUND

1. Field of Invention

The present invention relates to an electronic device and an operating method thereof. More particularly, the present invention relates to a mobile device and a rotating method of an image thereon.

2. Description of Related Art

With advances in communication technology, various kinds of mobile devices, such as mobile phones, tablet computers, and smart watches, are widely used in our daily lives.

A mobile device typically includes a display screen. The display screen is used to display an image. A typical mobile device has the capability of rotating the image. That is, no matter how the mobile device is oriented, the image is still displayed in a matter corresponding to a gravity direction. However, if a user operates the mobile device in a non-upright position (e.g., lying down), the image is still displayed corresponding to the gravity direction, causing inconvenience for the user looking at the image.

Thus, there is a need for a mobile device which is more convenient to operate.

SUMMARY

One aspect of the present disclosure is related to a rotating method of an image on a mobile device. In accordance with one embodiment of the present disclosure, the rotating method includes detecting a first included angle between a reference direction of the mobile device and a gravity direction, and detecting a first rotational direction that the reference direction of the mobile device has been rotated relative to the gravity direction through a gravity sensor; selectively generating a first rotating signal according to the first included angle; detecting a second included angle between a reference direction of a user's face and the gravity direction, and detecting a second rotational direction that the reference direction of the user's face has been rotated relative to the gravity direction through a face recognizer; selectively generating a second rotating signal according to the second included angle; and determining an image rotating direction of the image on the mobile device according to the first rotating signal and the second rotating signal.

Another aspect of the present disclosure is related to a mobile device. In accordance with one embodiment of the present disclosure, the mobile device includes a gravity sensor, a face recognizer, and a rotating module. The gravity sensor is configured to detect a first included angle between a reference direction of the mobile device and a gravity direction, detect a first rotational direction that the reference direction of the mobile device has been rotated relative to the gravity direction, and selectively generate a first rotating signal according to the first included angle. The face recognizer is configured to detect a second included angle between a reference direction of a user's face and the gravity direction, detect the second rotational direction that the reference direction of the user's face has been rotated relative to the gravity direction, and selectively generate a second rotating signal according to the second included angle. The rotating module is configured to determine an image rotating direction of an image on the mobile device according to the first rotating signal and the second rotating signal.

Another aspect of the present disclosure is related to a rotating method of an image on a mobile device. In accordance with one embodiment of the present disclosure, the rotating method includes detecting a first included angle between a reference direction of the mobile device and a gravity direction through a gravity sensor, selectively generating a first rotating signal according the first included angle, detecting a second included angle between a reference direction of a user's face and the gravity direction through a face recognizer, selectively generating a second rotating signal according the second included angle, and selectively rotating the image on the mobile device according to whether each of the first rotating signal and the second rotating signal is generated.

Through the application of one embodiment of the invention, the mobile device can rotate the image to an angle or a direction suitable for a user, such that a more user-friendly mobile device can be realized.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that words indicating direction used in the description of the following embodiments, such as "above," "below," "left," "right," "clockwise" and "counterclockwise," are directions as they relate to the accompanying drawings. Therefore, such words indicating direction are used for illustration and do not limit the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

One aspect of the present disclosure is related to a mobile device. To facilitate the description to follow, a mobile phone is taken as a descriptive example in the following paragraphs. However, in practice, the mobile device can be another portable device, such as a smart watch, a tablet computer, and so on.

Figure 1:
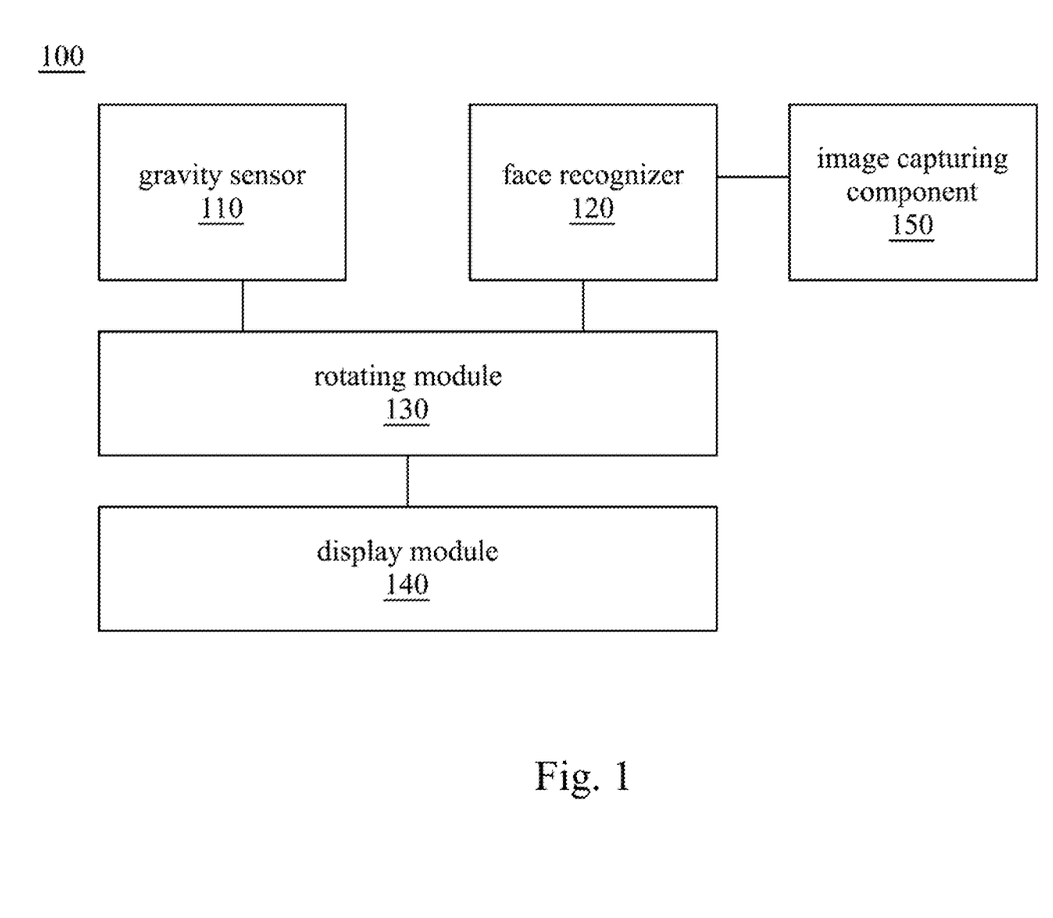
FIG. 1 is a schematic diagram of a mobile device according to one embodiment of the present invention.

FIG. 1 is a schematic diagram of a mobile device 100 according to one embodiment of the present invention. The mobile device 100 includes a gravity sensor 110, a face recognizer 120, a rotating module 130, a display module 140, and an image capturing component 150. In this embodiment, the rotating module 130 is electrically connected to the gravity sensor 110, the face recognizer 120, and the display module 140 separately. The face recognizer 120 is electrically connected to the image capturing component 150. It should be noted that the connections between each of the modules and components of the mobile device 100 are not limited by this embodiment, and any connection enabling the mobile device 100 to practice the technical features described below can be used herein.

In this embodiment, the face recognizer 120 and the rotating module 130 can be realized by, for example, a central processor, a microprocessor, or another suitable calculating device performing specific commands or specific computer programs stored in a memory. The display module 140 can be realized by, for example, a liquid crystal display panel, an electronic paper display panel, or another suitable display device. The image capturing component 150 can be realized by, for example, a camera commonly used in a mobile device and other electronic circuits.

Figure 2:
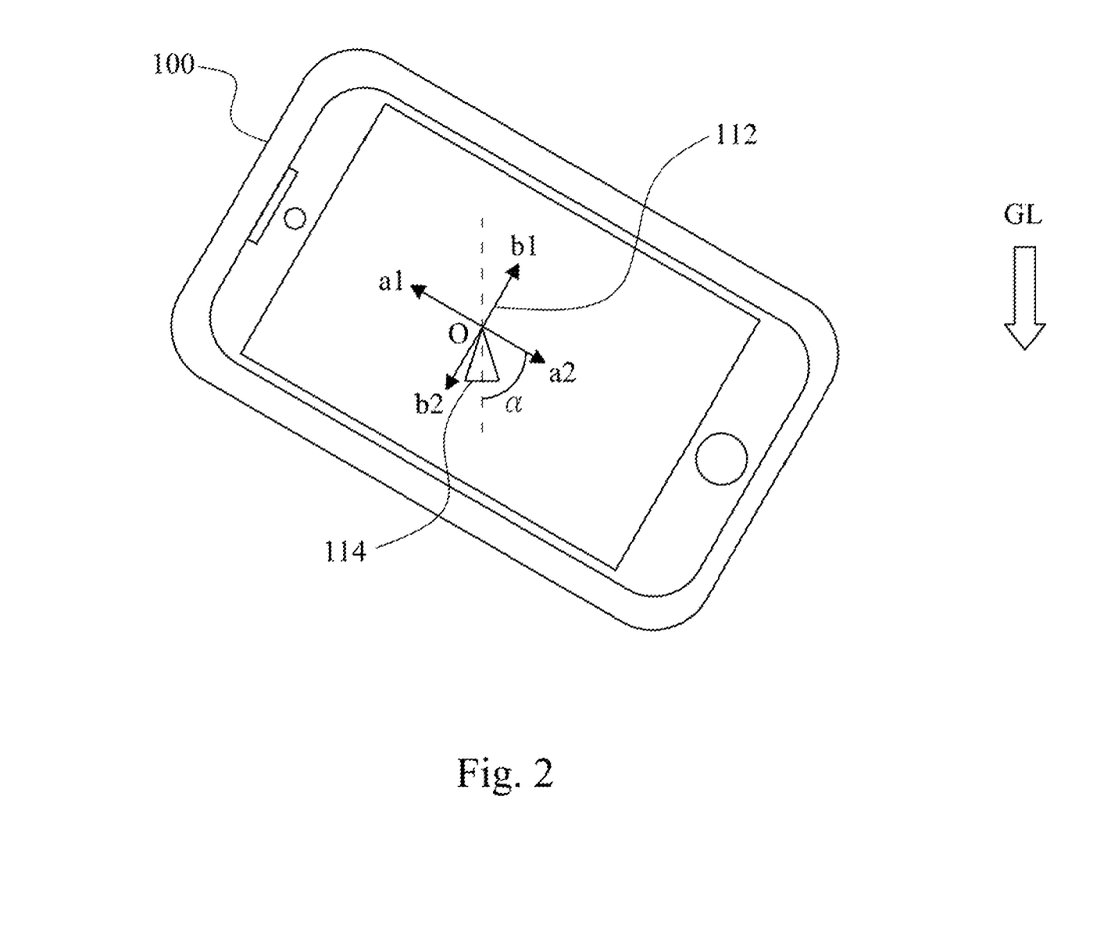
FIG. 2 illustrates an operating example of the mobile device in one operative embodiment.

Referring also to FIG. 2, the gravity sensor 110 can be realized by, for example, multiple piezoelectric plates 112, a heavy object 114, and other control circuits (not shown). The piezoelectric plates 112 are fixed on the mobile device 100, and are disposed orthogonal to each other in an a1-a2 direction and a b1-b2 direction. A point of intersection of the piezoelectric plates 112 is referred as to an O point. The heavy object 114 is pivoted on the O point and continuously points to a gravity direction (i.e., the direction of the Earth's gravity or toward the center of Earth). With such a configuration, in the condition that the mobile device 100 is rotated to a particular angle (e.g., rotated by 60 degrees counterclockwise), the gravity sensor 110 can acquire the gravity direction GL through calculating pressure components on the piezoelectric plates 112 (e.g., pressure components corresponding to the directions a2 and b2). By calculating a first included angle α between a reference direction of the device (e.g., the direction a2) and the gravity direction GL, the gravity sensor 110 can acquire the angle and the rotational direction that the mobile device 100 is rotated.

It should be noted that the realization of the gravity sensor 110 described above is given for illustrative purposes. The invention is not limited by the embodiment described above.

In this embodiment, the display module 140 is configured to display an image (e.g., the image 102 in FIGS. 4a-4e). The gravity sensor 110 is configured to detect the first included angle α between the reference direction of the mobile device 100 and the gravity direction GL, detect a first rotational direction indicating the direction that the reference direction of the mobile device 100 has been rotated relative to the gravity direction GL, and selectively generate a first rotating signal and output the same to the rotating module 130 according to the first included angle α.

The term "the orientation of the mobile device 100" used herein, for example, indicates to a designer defined orientation configured to be used to determine whether a body of the mobile device 100 is rotated or not. For example, in the present invention, the reference direction of the mobile device 100 is defined as the direction pointing to the bottom of the mobile device 100 (e.g., the direction a2 in FIG. 2 and the direction MO in FIGS. 4a-4e).

In an ideal state, through the operations described above, the rotating module 130 can rotate the image on the display module 140 according to the first rotating signal, so as to make the display module 140 display the image correspond to the gravity direction GL. For example, in a condition that the mobile device 100 is held horizontally (e.g., rotated 90 degrees clockwise or counterclockwise), the rotating module 130 can rotate the image on the display module 140 by 90 degrees in a first rotational direction opposite to the rotational direction that the mobile device 100 is rotated, such that the image on the display module 140 can be kept oriented in the same direction regardless of whether the mobile device 100 is horizontal or upright. As a result, a user oriented in an upright position can comfortably view the image of the display module 140 regardless of whether the mobile device 100 is horizontal or upright.

However, if the user operates the mobile device 100 in a non-upright position (e.g., lying down), it is not easy for the user to comfortably view such an image.

Thus, in this embodiment, the rotating module 130 is further configured to receive a second rotating signal provided by the face recognizer 120, and rotate the image on the mobile device 140 according to the second rotating signal.

More particularly, in this embodiment, the face recognizer 120 is configured to detect a second included angle β between a reference direction of the user's face and the gravity direction GL and detect a second rotational direction indicating the direction that the reference direction of the user's face has been rotated relative to the gravity direction GL through the image capturing component 150. The face recognizer 120 is further configured to selectively generate the second rotating signal and output the same to the rotating module 130 according to the second included angle β. In one embodiment, the image capturing component 150 captures a face image of the user, and the face recognizer 120 obtains the reference direction of the user's face through, for example, image recognition technology (e.g., using a face recognition algorithm). In addition, in one embodiment, the gravity sensor 110 can provide the gravity direction GL and the reference direction of the mobile device 100 to the face recognizer 120, such that the face recognizer 120 can perform calculations and comparisons accordingly.

The phrase "the reference direction of the user's face" used herein indicates, for example, a designer defined direction that is used to determine whether the user's face has been rotated. For example, in one embodiment of the present invention, the reference direction of the user's face is defined as the direction from a midpoint of the eyes of the user to a center of the lips of the user (e.g., the direction FO in FIGS. 4a-4e).

In addition, the rotating module 130 is configured to determine whether the first rotational signal and/or the second rotational signal are received (i.e., whether the first rotating signal and the second rotating signal are generated), and to selectively rotate the image of the mobile device 100 according to the first rotational direction and/or the second rotational direction.

Through the operations mentioned above, no matter how the mobile device 100 and/or the user's face are rotated, the mobile device 100 can rotate the image on the mobile device 100 to an angle or a direction suitable for the user. Hence, a more user-friendly mobile device can be realized.

In the following paragraphs, details of the invention are provided with reference to a rotating method of an image on a mobile device.

Another aspect of the present disclosure is related to a rotating method of an image on a mobile device. The rotating method can be applied to a mobile device having a structure that is the same as or similar to the mobile device 100 shown in FIG. 1. To simplify the description below, in the following paragraphs, the embodiment shown in FIG. 1 will be used as an example to describe the rotating method according to an embodiment of the present disclosure. However, the invention is not limited to application to the mobile device 100 in the embodiment shown in FIG. 1.

In addition, it should be noted that, in the steps of the following rotating method, no particular sequence is required unless otherwise specified. Moreover, the following steps also may be performed simultaneously or the execution times thereof may at least partially overlap.

Figure 3:
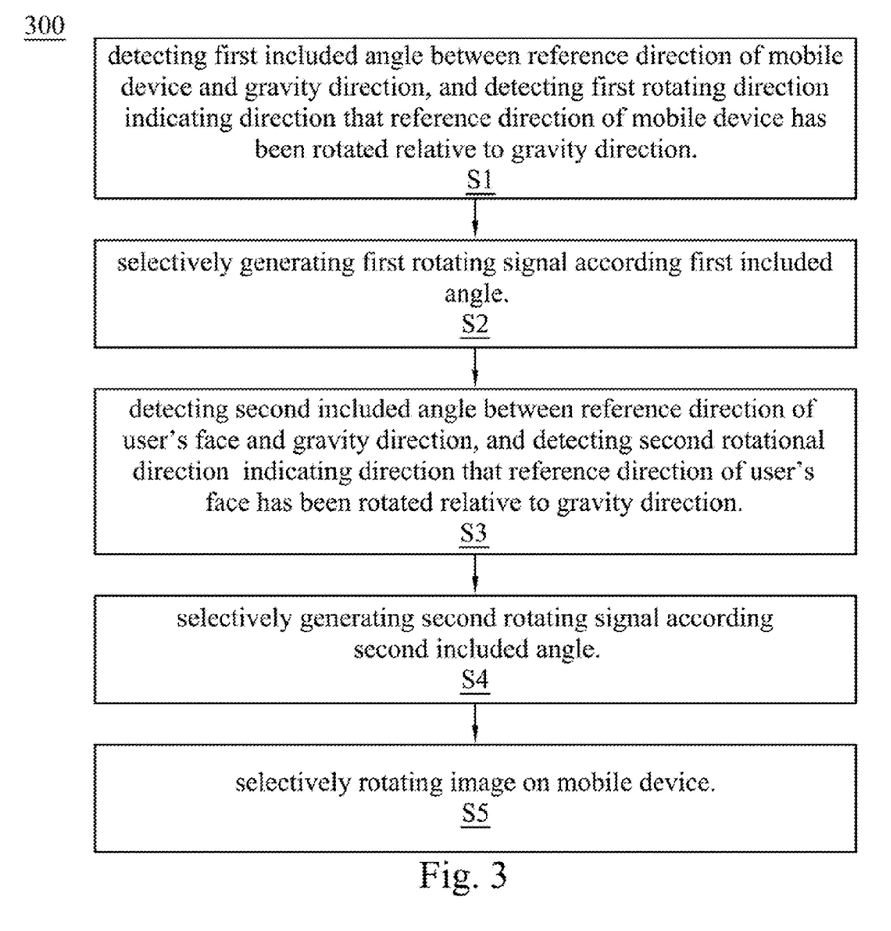
FIG. 3 is a flowchart of a rotating method of an image on the mobile device according to one embodiment of the present invention.

FIG. 3 is a flowchart of a rotating method 300 of an image on the mobile device 100 according to one embodiment of the present invention. The rotating method 300 includes the steps as described below.

In step S1, the gravity sensor 110 detects a first included angle α between a reference direction of the mobile device 100 and a gravity direction GL, and detects a first rotational direction indicating the direction that the reference direction of the mobile device 100 has been rotated relative to the gravity direction GL. Details of the reference direction of the mobile device 100 can be ascertained by referring to the above paragraphs, and a description in this regard will not be repeated herein.

In step S2, the gravity sensor 110 selectively generates a first rotating signal according the first included angle α. For example, the gravity sensor 110 determines whether the first included angle α is between a first upper bound and a first lower bound, generates the first rotating signal in a condition that the first included angle α is between the first upper bound and the first lower bound, and provides the first rotating signal to the rotating module 130. In this embodiment, the first upper bound is, for example, 135 degrees, and the first lower bound is, for example, 45 degrees. The first upper and lower bounds can be varied on the basis of actual requirements, and the invention is not limited by these particular angles.

In step S3, the face recognizer 120 detects a second included angle β between a reference direction of the user's face and the gravity direction GL, and detects the second rotational direction indicating the direction that the reference direction of the user's face has been rotated relative to the gravity direction GL through the image capturing component 150. Details of the face recognizer 120 can be ascertained by referring to the above paragraphs, and a description in this regard will not be repeated herein.

In step S4, the face recognizer 120 selectively generates a second rotating signal according the second include angle β. For example, the face recognizer 120 determines whether the second included angle β is between a second upper bound and a second lower bound, generates the second rotating signal in a condition that the second included angle β is between the second upper bound and the second lower bound, and provides the second rotating signal to the rotating module 130. In one embodiment of the present invention, the second upper bound is, for example, 135 degrees, and the second lower bound is, for example, 45 degrees. The second upper and lower bounds can be varied on the basis of actual requirements, and the invention is not limited by these particular angles.

In step S5, the rotating module 130 selectively rotates the image of the mobile device 100 in an image rotating direction opposite to the first rotational direction and/or identical to the second rotational direction according to the first rotating signal and/or the second rotating signal, Through the operations mentioned above, no matter how the mobile device 100 and/or the user's face are rotated, the mobile device 100 can rotate the image on the mobile device 100 to an angle or a direction suitable for the user.

Details of the invention are provided with reference to various operative embodiments in FIGS. 4a-4e in the following paragraphs. However, the present invention is not limited to the operative embodiments below.

In addition, to facilitate the operative embodiments described below, in the following paragraphs, y-axis and z-axis in a rectangular coordinate system will be used as reference directions, and the gravity direction GL coincides with the −z direction of the rectangular coordinate system. However, the present invention is not limited to such a rectangular coordinate system.

Figure 4A:
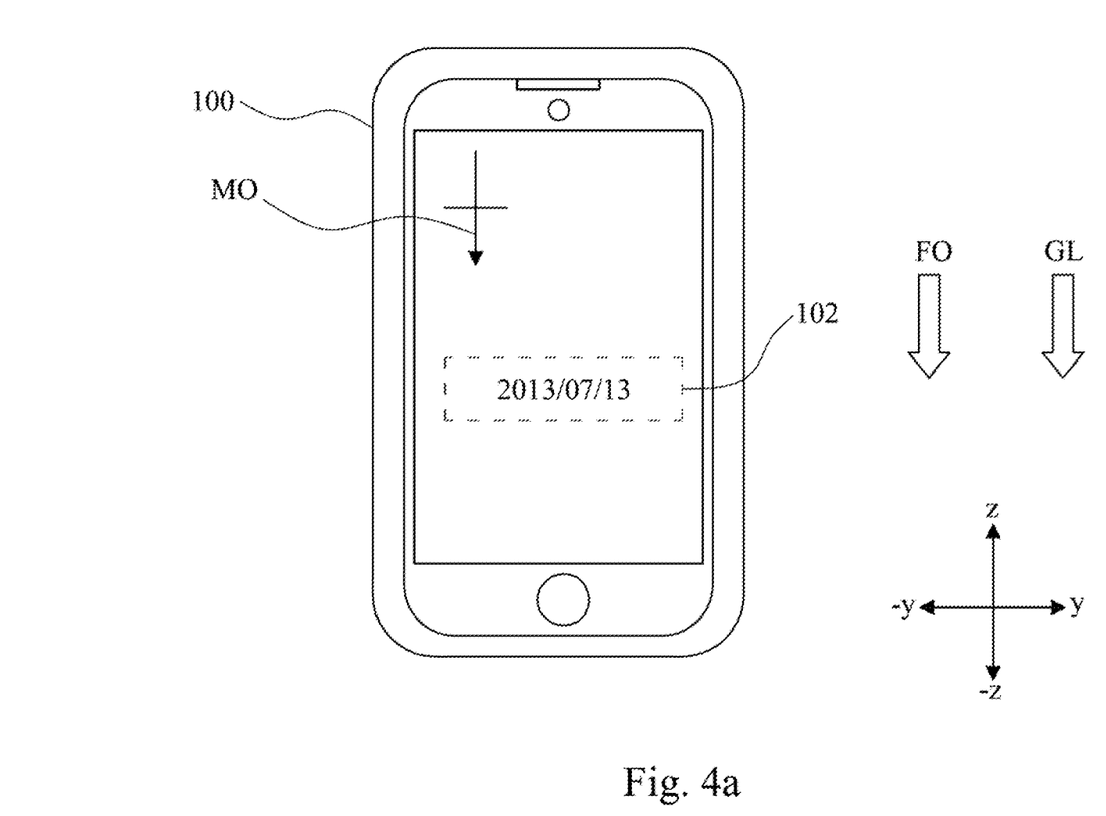
FIG. 4a illustrates an operating example of the mobile device in one operative embodiment.

Referring to FIG. 4a, in this operative embodiment, the mobile device 100 is upright and the reference direction of the mobile device MO is directed toward the −z direction. That is, the reference direction of the mobile device MO coincides with the gravity direction GL, and the first included angle α between the reference direction of the mobile device MO and the gravity direction GL is 0 degrees. In addition, the user's face is upright and the reference direction of the user's face FO is directed toward the −z direction. That is, the reference direction of the user's face FO coincides with the gravity direction GL, and the second included angle β between the reference direction of the user's face FO and the gravity direction GL is 0 degrees.

At this time, the first included angle α is not between the first upper bound (e.g., 135 degrees) and the first lower bound (e.g., 45 degrees), the second included angle β is not between the first upper bound (e.g., 135 degrees) and the first lower bound (e.g., 45 degrees). Therefore, both of the first rotating signal and the second rotating signal are not generated. Thus, the rotating module 130 does not rotate the image 102 of the mobile device 100. It should be noted that the content of the image 102 is shown as the date "2013/07/13" by way of example, but the invention is not limited to such an example.

Figure 4B:
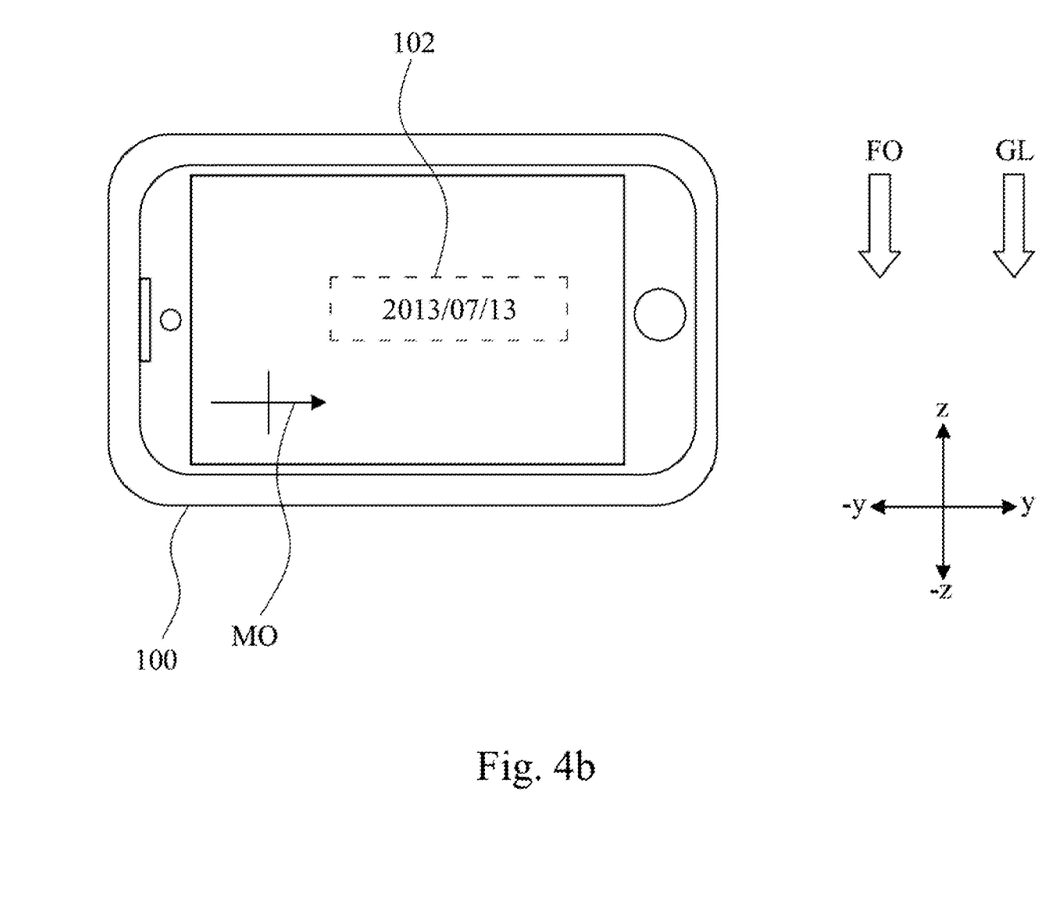
FIG. 4b illustrates an operating example of the mobile device in one operative embodiment.

Referring to FIG. 4b, in this operative embodiment, the mobile device 100 is horizontal. That is, the mobile device 100 is rotated by 90 degrees counterclockwise, the reference direction of the mobile device MO is directed toward the y direction, the first included angle α between the reference direction of the mobile device MO and the gravity direction GL is 90 degrees, and the first rotational direction that the reference direction of the mobile device MO has been rotated relative to the gravity direction GL is a counterclockwise direction (i.e., the reference direction of the mobile device MO is in a counterclockwise direction relative to the gravity direction GL). In addition, the user's face is upright and the reference direction of the user's face FO is directed toward the −z direction. That is, the reference direction of the user's face FO coincides with the gravity direction GL, and the second included angle β between the reference direction of the user's face FO and the gravity direction GL is 0 degrees.

At this time, the first included angle α is between the first upper bound (e.g., 135 degrees) and the first lower bound (e.g., 45 degrees), while the second included angle β is not between the first upper bound (e.g., 135 degrees) and the first lower bound (e.g., 45 degrees). Therefore, the first rotating signal is generated, while the second rotating signal is not generated. Thus, the rotating module 130 rotates the image 102 on the mobile device 100 by a first image rotating angle (e.g., 90 degrees) in an image rotating direction opposite to the first rational direction (i.e., rotates the image 102 clockwise). It is noted that the first image rotating angle can be varied on the basis of actual requirements, and the invention is not limited by the particular angles mentioned herein.

Similarly, in a condition that the mobile device 100 is rotated by 90 degrees clockwise and the user's face is upright (not shown), the first included angle α is 90 degrees, the first rotational direction is a clockwise direction, and the second included angle β is 0 degrees. Therefore, the rotating module 130 rotates the image 102 on the mobile device 100 by the first image rotating angle (e.g., 90 degrees) in an image rotating direction opposite to the first rational direction (i.e., rotates the image 102 counterclockwise).

Figure 4C:
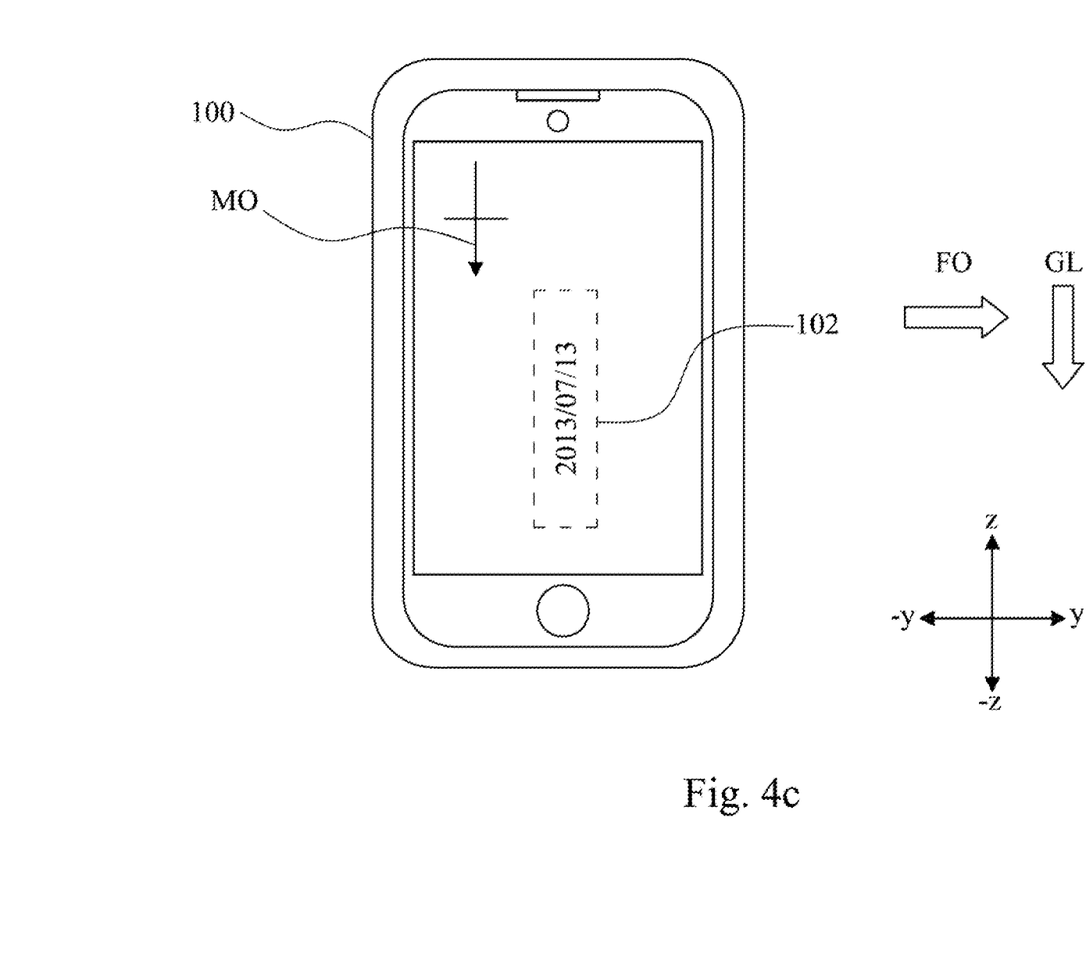
FIG. 4c illustrates an operating example of the mobile device in one operative embodiment.

Referring to FIG. 4c, in this operative embodiment, the mobile device 100 is upright and the reference direction of the mobile device MO is directed toward the −z direction. That is, the reference direction of the mobile device MO coincides with the gravity direction GL, and the first included angle α between the reference direction of the mobile device MO and the gravity direction GL is 0 degrees. In addition, the user's face is horizontal. That is, the user's face is rotated by 90 degrees counterclockwise. The reference direction of the user's face FO is directed toward the y direction, the second included angle β between the reference direction of the user's face FO and the gravity direction GL is 90 degrees, and the second rotational direction that the reference direction of the user's face FO has been rotated relative to the gravity direction GL is a counterclockwise direction (i.e., the reference direction of the user's face FO is in a counterclockwise direction from the gravity direction GL).

At this time, the first included angle α is not between the first upper bound (e.g., 135 degrees) and the first lower bound (e.g., 45 degrees), while the second included angle β is between the first upper bound (e.g., 135 degrees) and the first lower bound (e.g., 45 degrees). Therefore, the first rotating signal is not generated while the second rotating signal is generated. Thus, the rotating module 130 rotates the image 102 on the mobile device 100 by the first image rotating angle (e.g., 90 degrees) in an image rotating direction identical to the second rational direction (i.e., rotates the image 102 counterclockwise).

Similarly, in a condition that the mobile device 100 is upright and the user's face is rotated by 90 degrees clockwise, the first included angle α is 0 degree, the second included angle β is 90 degrees, and the second rotational direction is a clockwise direction. Therefore, the rotating module 130 rotates the image 102 on the mobile device 100 by the first image rotating angle (e.g., 90 degrees) in an image rotating direction identical to the second rational direction (i.e., rotates the image 102 clockwise).

Figure 4D:
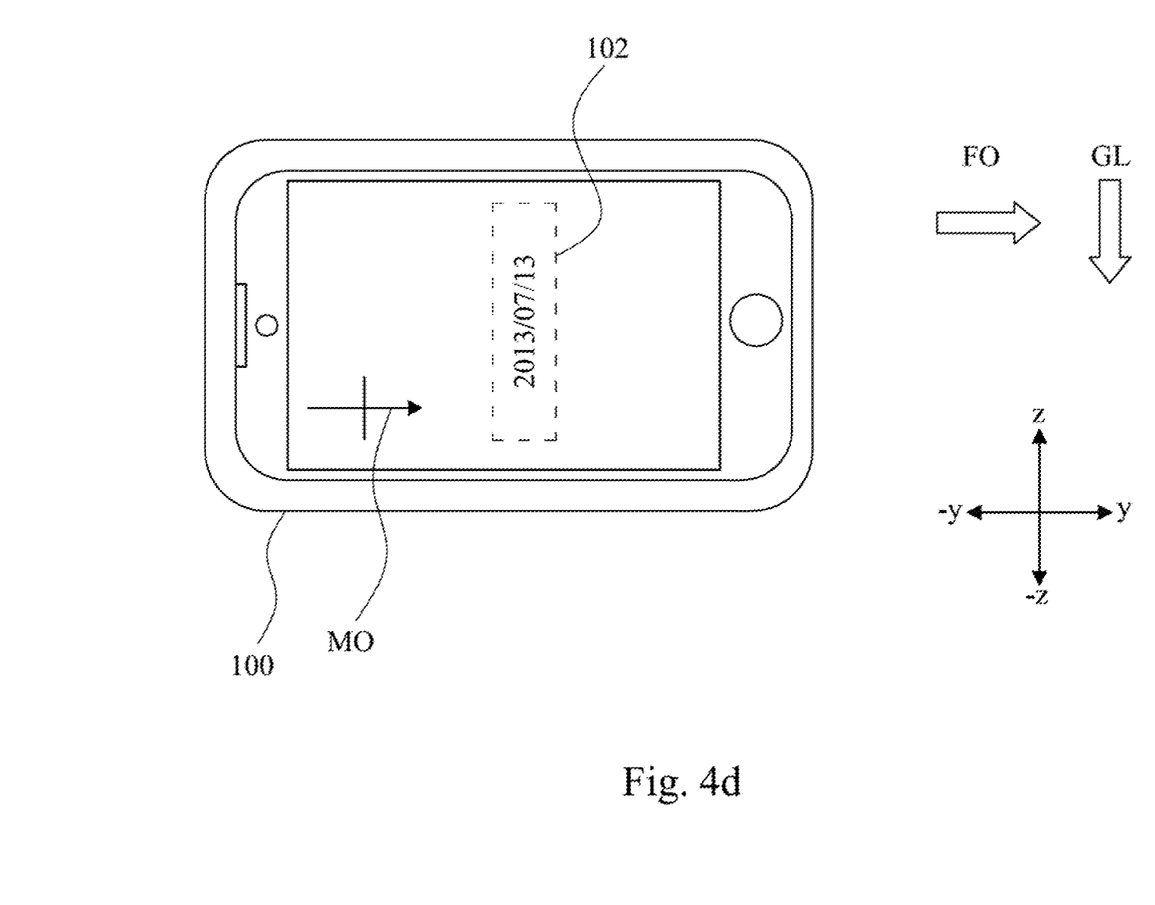
FIG. 4d illustrates an operating example of the mobile device in one operative embodiment.

Referring to FIG. 4d, in this operative embodiment, the mobile device 100 is horizontal. That is, the mobile device 100 is rotated by 90 degrees counterclockwise, the reference direction of the mobile device MO is directed toward the y direction, the first included angle α between the reference direction of the mobile device MO and the gravity direction GL is 90 degrees, and the first rotational direction that the reference direction of the mobile device MO has been rotated relative to the gravity direction GL is a counterclockwise direction (i.e., the reference direction of the mobile device MO is in a counterclockwise direction from the gravity direction GL). In addition, the user's face is horizontal. That is, the user's face is rotated by 90 degrees counterclockwise, and the reference direction of the user's face FO is toward the y direction. Therefore, the second included angle β between the reference direction of the user's face FO and the gravity direction GL is 90 degrees and the second rotational direction that the reference direction of the user's face FO has been rotated relative to the gravity direction GL is a counterclockwise direction (i.e., the reference direction of the user's face FO is in a counterclockwise direction from the gravity direction GL).

At this time, the first included angle α is between the first upper bound (e.g., 135 degrees) and the first lower bound (e.g., 45 degrees), and the second included angle β is between the first upper bound (e.g., 135 degrees) and the first lower bound (e.g., 45 degrees). Therefore, both of the first rotating signal and the second rotating signal are generated. Due to the fact that the first rotational direction and the second rotational direction are the same, the effects of the first rotating signal and the second rotating signal are counteracted by each other, such that the rotating module 130 does not rotate the image 102 on the mobile device 100.

Similarly, in a condition that the mobile device 100 is rotated by 90 degrees clockwise and the user's face is rotated by 90 degrees clockwise (not shown), both of the first included angle α and the second included angle β are 90 degrees, and both of the first rotational direction and the second rotational direction are clockwise directions. Therefore, the rotating module 130 does no rotate the image 102 of the mobile device 100.

Figure 4E:
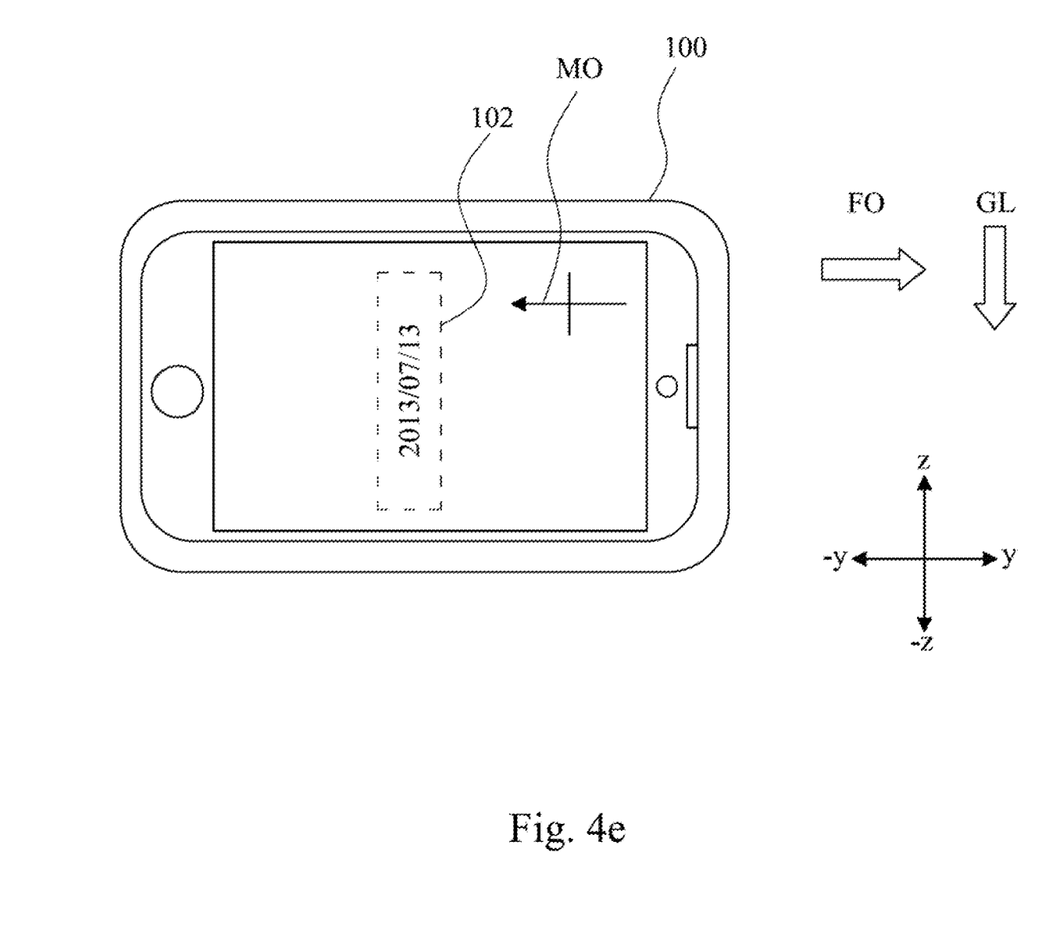
FIG. 4e illustrates an operating example of the mobile device in one operative embodiment.

Referring to FIG. 4e, in this operative embodiment, the mobile device 100 is horizontal. That is, the mobile device 100 is rotated by 90 degrees counterclockwise, and the reference direction of the mobile device MO is directed toward the −y direction. The first included angle α between the reference direction of the mobile device MO and the gravity direction GL is 90 degrees, and the first rotational direction that the reference direction of the mobile device MO has been rotated relative to the gravity direction GL is a clockwise direction (i.e., the reference direction of the mobile device MO is in a clockwise direction from the gravity direction GL). In addition, the user's face is horizontal. That is, the user's face is rotated by 90 degrees counterclockwise, and the reference direction of the user's face FO is directed toward the y direction. The second included angle β between the reference direction of the user's face FO and the gravity direction GL is 90 degrees, and the second rotational direction that the reference direction of the user's face FO has been rotated relative to the gravity direction GL is a counterclockwise direction (i.e., the reference direction of the user's face FO is in a counterclockwise direction from the gravity direction GL).

At this time, the first included angle α is between the first upper bound (e.g., 135 degrees) and the first lower bound (e.g., 45 degrees), and the second included angle β is between the first upper bound (e.g., 135 degrees) and the first lower bound (e.g., 45 degrees). Therefore, both of the first rotating signal and the second rotating signal are generated. Due to the fact that the first rotational direction is opposite to the second rotational direction, the effects of the first rotating signal and the second rotating signal are additive, such that the rotating module 130 rotates the image 102 on the mobile device 100 by the second image rotating angle (e.g., 180 degrees) in an image rotating direction identical to the second rational direction and opposite to the first rational direction (i.e., rotates the image 102 counterclockwise). The second image rotating angle is greater than the first image rotating angle. It should be noted that the second image rotating angle can be varied on the basis of actual requirements, and the invention is not limited to the example described herein.

Similarly, in a condition that the mobile device 100 is rotated by 90 degrees counterclockwise and the user's face is rotated by 90 degrees clockwise (not shown), both of the first included angle α and the second included angle β are 90 degrees, and the first rotational direction is a counterclockwise direction and the second rotational direction is a clockwise direction. Therefore, the rotating module 130 rotates the image 102 of the mobile device 100 by a second image rotating angle (e.g., 180 degrees) in an image rotating direction opposite to the first rational direction and identical to the second rational direction (i.e., rotates the image 102 clockwise).

Figure 5:
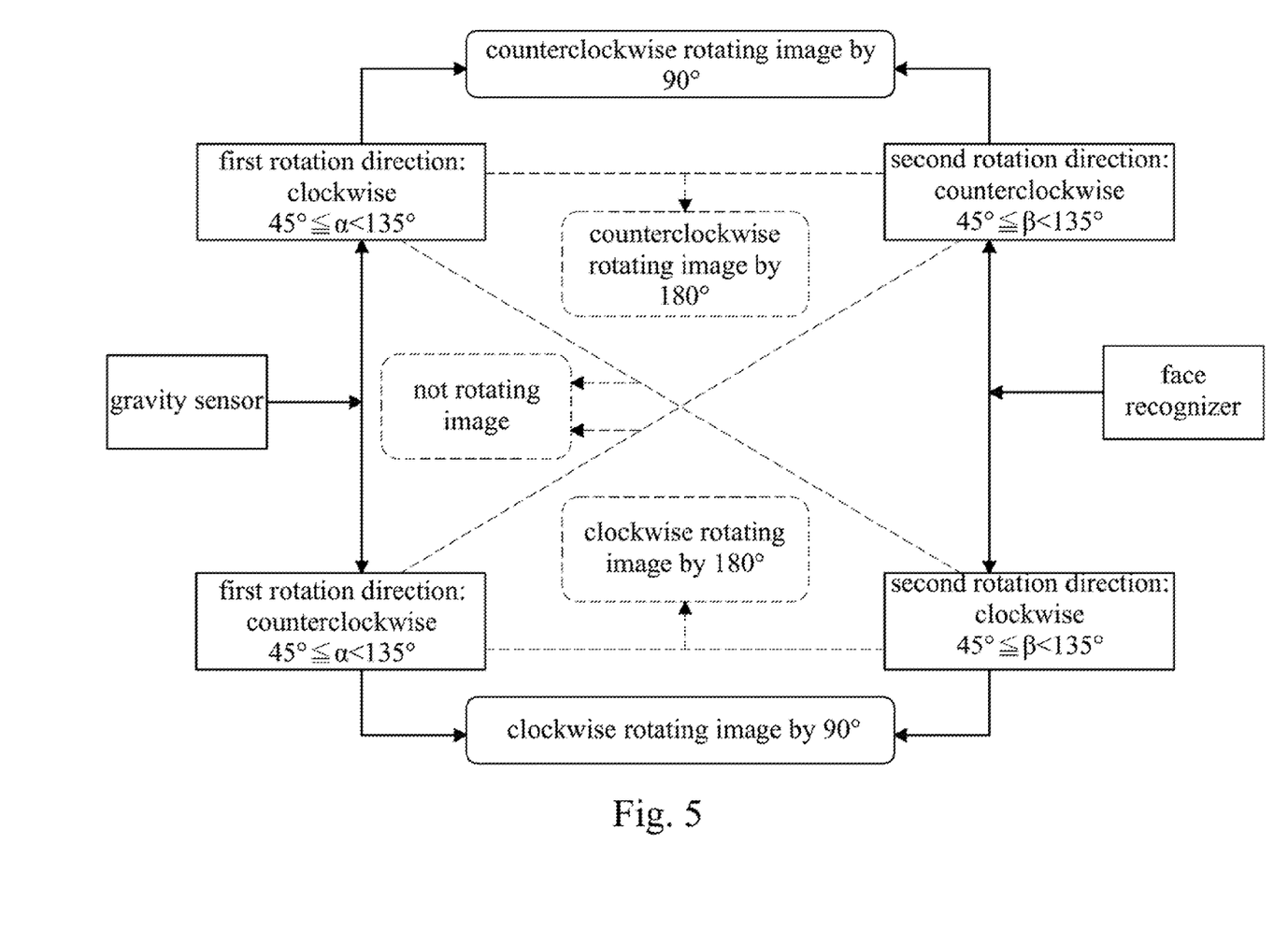
FIG. 5 illustrates an operating example of the mobile device in one operative embodiment.

To further explain the rotations of the image 102, reference is made to FIG. 5. As the solid lines in FIG. 5 illustrate, in a condition that one of the first rotating signal and the second rotating signal is generated and the other one of the first rotating signal and the second rotating signal is not generated, the rotating module 130 rotates the image 102 on the mobile device 100 by the first image rotating angle, that is, 90 degrees, in an image rotating direction opposite to the first rotational direction or identical to the second rotational direction.

As the dotted lines in the FIG. 5 illustrate, in a condition that both of the first rotating signal and the second rotating signal are generated, if the first rotational direction is identical to the second rotational direction, the rotating module 130 does not rotate the image 102 on the mobile device 100. However, if the first rotational direction is opposite to the second rotational direction, the rotating module 130 rotates the image 102 on the mobile device 100 by the second image rotating angle in an image rotating direction opposite to the first rotational direction and identical to the second rotational direction.

In other words, the rotating module 130 determines whether to rotate the image 102 on the mobile device 100 and how to rotate the image 102 on the mobile device 100 according to whether the first rotating signal and the second rotating signal are generated and the first rotational direction is identical to the second rotational direction.

It should be noted that all the values mentioned above can be varied on the basis of actual requirements, and the values are not limited to the embodiments described above.

Although the present invention has been described in considerable detail with reference to certain embodiments thereof, other embodiments are possible. Therefore, the scope of the appended claims should not be limited to the description of the embodiments contained herein.

What is claimed is:

1. A rotating method of an image on a mobile device comprising:
   detecting, through a gravity sensor, a first included angle between an reference direction of the mobile device and a gravity direction, and detecting a first rotational direction that the reference direction of the mobile device has been rotated relative to the gravity direction;
   selectively generating a first rotating signal according to the first included angle;
   detecting, through a face recognizer, a second included angle between a reference direction of a user's face and the gravity direction, and detecting a second rotational direction that the reference direction of the user's face has been rotated relative to the gravity direction, wherein the second included angle is detected, regardless of the first included angle, as an angle between the reference direction of the user's face and the gravity direction;
   selectively generating a second rotating signal according to the second included angle simultaneously with generation of the first rotating signal; and
   determining an image rotating direction of the image on the mobile device according to an additive combination of both the first rotating signal and the second rotating signal.

2. The rotating method as claimed in claim 1, wherein the step of determining the image rotating direction of the image on the mobile device comprises:
   rotating the image on the mobile device in a rotational direction opposite to the first rotational direction or identical to the second rotational direction in a condition that one of the first rotating signal and the second rotating signal is generated, and the other one of the first rotating signal and second rotating signal is not generated.

3. The rotating method as claimed in claim 1, wherein the step of determining the image rotating direction of the image on the mobile device comprises:
   not rotating the image on the mobile device in a condition that both of the first rotating signal and the second rotating signal are not generated.

4. The rotating method as claimed in claim 1, wherein the step of determining the image rotating direction of the image on the mobile device comprises:
   not rotating the image on the mobile device in a condition that both of the first rotating signal and the second rotating signal are generated and the first rotational direction is identical to the second rotational direction.

5. The rotating method as claimed in claim 1, wherein the step of determining the image rotating direction of the image on the mobile device comprises:
   rotating the image on the mobile device in a condition that both of the first rotating signal and the second rotating signal are generated and the first rotational direction is opposite to the second rotational direction.

6. The rotating method as claimed in claim 1, wherein the step of determining the image rotating direction of the image on the mobile device comprises:
   rotating the image on the mobile device by a first image rotating angle in a rotational direction opposite to the first rotational direction in a condition that the first rotating signal is generated and the second rotating signal is not generated; and
   rotating the image on the mobile device by the first image rotating angle in a rotational direction identical to the second rotational direction in a condition that the second rotating signal is generated and the first rotating signal is not generated.

7. The rotating method as claimed in claim 6, wherein the step of determining the image rotating direction of the image on the mobile device comprises:
   rotating the image on the mobile device by a second image rotating angle in a rotational direction opposite to the first rotational direction and identical to the second rotational direction in a condition that both of the first rotating signal and the second rotating signal are generated and the first rotational direction is opposite to the second rotational direction, wherein the second image rotating angle is greater than the first image rotating angle.

8. The rotating method as claimed in claim 1, wherein the step of selectively generating the first rotating signal comprises:
   determining whether the first included angle is between a first upper bound and a first lower bound; and
   generating the first rotating signal in a condition that the first included angle is between the first upper bound and the first lower bound; and
the step of selectively generating the second rotating signal comprises:
   determining whether the second included angle is between a second upper and a second lower bound; and
   generating the second rotating signal in a condition that the second included angle is between the second upper and the second lower bound.

9. A mobile device comprising:
   a gravity sensor configured to detect a first included angle between a reference direction of the mobile device and a gravity direction, detect a first rotational direction that the reference direction of the mobile device has been rotated relative to the gravity direction, and selectively generate a first rotating signal according to the first included angle;
   a face recognizer configured to detect a second included angle between a reference direction of a user's face and the gravity direction, detect a second rotational direction that the reference direction of the user's face has been rotated relative to the gravity direction, and selectively generate a second rotating signal according to the second included angle simultaneously with generation of the first rotating signal, wherein the second included angle is detected, regardless of the first included angle, as an angle between the reference direction of the user's face and the gravity direction; and
   a rotating module configured to determine an image rotating direction of an image on the mobile device according to an additive combination of both the first rotating signal and the second rotating signal.

10. The mobile device as claimed in claim 9, wherein the rotating module rotates the image on the mobile device in a condition that one of the first rotating signal and the second rotating signal is generated and the other one of the first rotating signal and the second rotating signal is not generated.

11. The mobile device as claimed in claim 9, wherein the rotating module does not rotate the image on the mobile device in a condition that both of the first rotating signal and the second rotating signal are not generated.

12. The mobile device as claimed in claim 9, wherein the rotating module does not rotate the image on the mobile device in a condition that both of the first rotating signal and the second rotating signal are generated, and the first rotational direction is identical to the second rotational direction.

13. The mobile device as claimed in claim 9, wherein the rotating module rotates the image on the mobile device in a condition that both of the first rotating signal and the second rotating signal are generated, and the first rotational direction is opposite to the second rotational direction.

14. The mobile device as claimed in claim 9, wherein the rotating module is configured to rotate the image on the mobile device by a first image rotating angle in a rotational direction opposite to the first rotational direction in a condition that the first rotating signal is generated and the second rotating signal is not generated, and
   the rotating module is configured to rotate the image on the mobile device by the first image rotating angle in a rotational direction identical to the second rotational direction in a condition that the second rotating signal is generated and the first rotating signal is not generated.

15. The mobile device as claimed in claim 14, wherein the rotating module is configured to rotate the image on the mobile device by a second image rotating angle in a rotational direction opposite to the first rotational direction and identical to the second rotational direction in a condition that both of the first rotating signal and the second rotating signal are generated, and the first rotational direction is opposite to the second rotational direction, wherein the second image rotating angle is greater than the first image rotating angle.

16. The mobile device as claimed in claim 9, wherein the gravity sensor is configured to determine whether the first included angle is between a first upper bound and a first lower bound, and generate the first rotating signal in a condition that the first included angle is between the first upper bound and the first lower bound, and
   the face recognizer is configured to determine whether the second included angle is between a second upper bound and a second lower bound, and generate the second rotating signal in a condition that the second included angle is between the second upper bound and the second lower bound.

17. A rotating method of an image on a mobile device comprising:
   detecting, through a gravity sensor, a first included angle between a reference direction of the mobile device and a gravity direction;
   selectively generating a first rotating signal according to the first included angle;
   detecting, through a face recognizer, a second included angle between a reference direction of a user's face and the gravity direction, wherein the second included angle is detected, regardless of the first included angle, as an angle between the reference direction of the user's face and the gravity direction;
   selectively generating a second rotating signal according the second included angle simultaneously with generation of the first rotating signal; and
   selectively rotating the image on the mobile device according to whether an additive combination of both the first rotating signal and the second rotating signal are generated.

18. The rotating method as claimed in claim 17, further comprising:
   detecting, through the gravity sensor, a first rotational direction that the reference direction of the mobile device has been rotated relative to the gravity direction; and
   detecting, through the face recognizer, a second rotational direction that the reference direction of the user's face has been rotated relative to the gravity direction;
   wherein the step of selectively rotating the image on the mobile device further comprises:
      determining whether to rotate the image on the mobile device according to whether each of the first rotating signal and the second rotating signal is generated and the first rotational direction is identical to the second rotational direction.

19. The rotating method as claimed in claim 18, wherein the step of selectively rotating the image on the mobile device further comprises:
- rotating the image on the mobile device in a rotational direction opposite to the first rotational direction and/or identical to the second rotational direction.

20. The rotating method as claimed in claim 19, wherein the step of rotating the image on the mobile device further comprises:
- rotating the image on the mobile device by a first image rotating angle in a condition that one of the first rotating signal and the second rotating signal is generated, and the other one of the first rotating signal and the second rotating signal is not generated; and
- rotating the image on the mobile device by a second image rotating angle in a condition that both of the first rotating signal and the second rotating signal are generated, wherein the second image rotating angle is greater than the first image rotating angle.

* * * * *